Figure 1:
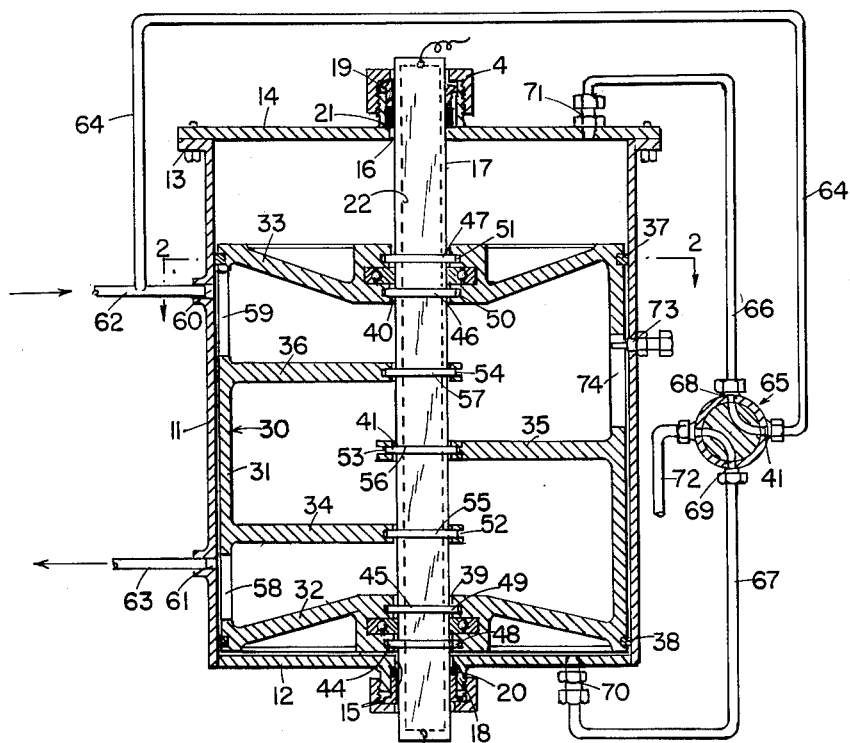

June 23, 1964 S. ELLNER ET AL 3,138,708
APPARATUS FOR ULTRAVIOLET IRRADIATION OF FLUIDS
Filed June 1, 1962

INVENTORS.
Sidney Ellner
BY Robert W. Marx
Maxwell E. Sparrow
ATTORNEY.

United States Patent Office 3,138,708
Patented June 23, 1964

3,138,708
APPARATUS FOR ULTRAVIOLET IRRADIATION OF FLUIDS
Sidney Ellner and Robert W. Marx, Hartsdale, N.Y., assignors to Ultra Dynamics Corp., Elenite Division, New York, N.Y.
Filed June 1, 1962, Ser. No. 199,430
6 Claims. (Cl. 250—46)

This invention generally relates to apparatus for purifying and sterilizing liquids and fluids, and more particularly to such apparatus in which the effect of high-frequency, very short wave length light rays is used for ultraviolet irradiation of liquids, such as water.

The application of such rays for the purpose of purifying and sterilizing of fluids of all kinds is known. Apparatus and devices for using the powerful effect of these rays for destroying, reducing and preventing the existence of undesirable bacteria, germs, viruses, molds, algae or similar microorganisms have been designed and constructed, but invariably these designs have the disadvantage in that the ray-emitting or irradiating source does not come into contact with the fluids to be treated, which is close enough for rendering the highest possible efficiency of the influence of said rays. The very nature of these rays, which belong to the ultraviolet range of the spectrum, requires a short distance between the emitting source and the object to be irradiated, because the intensity of these short-wave, high-frequency rays decreases fast with the increase of said distance. Other devices have been known wherein the ray-emitting sources are directly inserted temporarily into the fluids but these devices cannot be considered as efficient and as permanent installations on a production basis, as the device of this invention is intended to be.

Furthermore, the intensity and thus the efficiency of the irradiation decreases with increasing deposits of natural impurities on the faces of the radiation sources, and therefore it becomes necessary to clean these faces at certain intervals. Devices which have become known have to be shut down, bypassed and taken apart for such maintenance work.

This invention consists in the novel parts, construction elements and arrangements, combinations of parts and improvements as may be shown and described in connection with the apparatus herein disclosed by way of example only and as illustration of a preferred embodiment. Objects and advantages of the invention will be set forth in part hereafter and in part will be obvious herefrom as may be learned by practicing the invention, the same being realized and attained by means of the instrumentalities and combinations pointed out in the appended claims.

It is a general object of the present invention to provide apparatus for purifying and sterilizing raw fluids by ultraviolet irradiation.

Another object of the present invention resides in designing a device for sterilizing and purifying contaminated liquids and fluids for continuous duty.

It is a further object of the present invention to provide a device for maintaining the intensity of the irradiation during the continuous, uninterrupted operation of the device.

Yet another object of the present invention is to design an apparatus of the aforementioned kind which is economical, efficient and provides easy and convenient maintenance operation without interrupting the purifying and sterilizing action upon the flow of the fluid.

A further object of the present invention is to provide an ultraviolet irradiation apparatus which is safe and continuous in operation and which is simple, sturdy and reliable.

Various further and more specific objects, features and advantages will clearly appear from the detailed description given below taken in connection with the acompanying drawing which forms part of this specification and merely illustrates by way of example one embodiment of the device of the invention. In the following description and in the claims, parts will be identified by specific names for convenience, but such names are intended to be as generic in their application to similar parts as the art will permit. Like reference characters denote like parts in the drawing, illustrating a preferred embodiment by which the invention may be realized.

Figure 2:
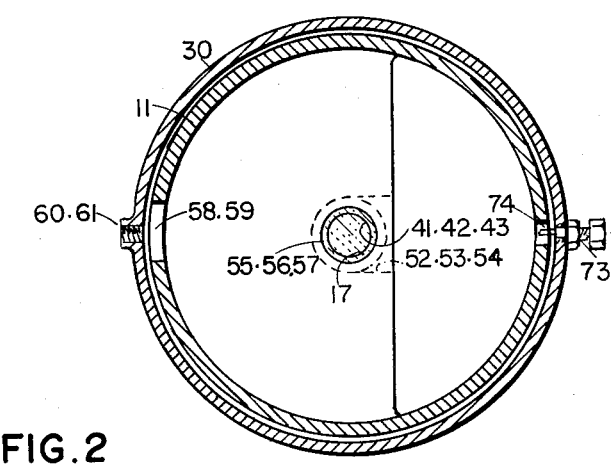

FIG. 1 shows a longitudinal section of the device;
FIG. 2 shows a cross-section of the device along the line 2—2 of FIG. 1;

Referring now in more detail to the drawing, there is in FIG. 1 a cylindrical container 11 which has a bottom 12 on one end and a flange 13 on the other end thereof. A cover or lid 14 is tightly bolted on said flange 13. In the center of the bottom 12 is a hole 15 and in the center of the cover 14 also is a hole 16. Through these two holes, a jacket 17 is inserted which may be quartz or glass having adequate ultraviolet transmission characteristics. On the bottom 12 and on the cover 14, glands 18 and 19, respectively, are arranged, having packing facilities 20 and 21, respectively, through which said jacket 17 is watertight sealed in bottom 12 and in cover 14. An ultraviolet irradiating tube 22 is inserted into said jacket 17. A cylindrical device 30, herein called a "turbulator," is glidably inserted in said container 11. Turbulator 30 consists of a cylindrical body 31, closed on both ends by bottom plates 32, 33 and of a plurality of intermediate baffle plates 34, 35, 36. Piston rings 37, 38 are arranged in corresponding grooves in the outer wall of said turbulator 30 near the ends thereof, which permit the turbulator 30 to glide in container 11 without any liquid passing by.

In each one of the bottom plates 32, 33 is a bore 39, 40, respectively, for permitting jack 17 to pass through. In each one of the intermediate baffle plates 34, 35, 36 is also a central bore 41, 42, 43 through which the jacket 17 passes (FIG. 2). In each one of the bores 39, 40 of said bottom plates 32, 33 are piston rod scrapers 44, 45 and 46, 47, made of teflon or other suitable material, in corresponding grooves 48, 49, 50, 51. These scrapers are held by garter springs (not shown in detail) tightly against the jacket 17. In each one of the intermediate baffle plates 34, 35, 36 is a slot 52, 53, 54, into which a scraper ring 55, 56, 57 is inserted, which fits tightly over the jacket 17, but is fitted in the slot 52, 53, 54 with a loose fit for allowing a slight self-adjustment and for preventing binding on the jacket.

Near the bottoms 32, 33 of the turbulator 30 are longitudinal slots 58, 59 serving as an intake and an outlet, respectively, for the liquid or fluid to be purified or sterilized. Opposite the slots 58, 59 are openings 60, 61 in the wall of container 11, into which pipe lines 62, 63 are secured. The openings 60, 61 are arranged at a certain distance from the bottom 12 and from the flange 13, respectively. The turbulator 30 is shorter than the container 11, and the difference in length between the turbulator and the container corresponds to the distance of the openings 60, 61 from the bottom 12 and from the flange 13 of the container 11, and also corresponds to the length of the longitudinal slots 58, 59. Thus, the turbulator 30 can move up and down in the container 11 while fluid is uninterruptedly admitted through the openings 60, 61 and can circulate through the turbulator 30.

A branchline 64 of the infeed line 62 leads to a four-way valve 65. Pipe lines 66, 67 connect two opposite ports 68, 69 of said four-way valve to intake fittings 70, 71 which are arranged in the bottom 12 and the cover 13, respectively, of the container 11. A fourth pipe line 72 is connected to the four-way valve 65 for serving as a drain line. In order to prevent the turbulator 30 from rotating about its longitudinal axis, a set screw 73 is arranged in the wall of the container 11, and a corresponding slot 74 for receiving the set screw 73 is cut into the wall of the turbulator 30.

The operation of the apparatus is as follows:

The fluid or water to be irradiated is admitted through pipe line 62, opening 60 and slot 59 to the turbulator 30, where it comes into direct contact with the jacket 17 of the ultraviolet ray-emitting tube. The water is thoroughly turbulated by means of the baffle plates 34, 35, 36 so that all particles of the water are uniformly exposed to ultraviolet rays, until it is discharged through slot 58, opening 61 into the purified water line 63. These baffles form a directed passageway for the water or other fluid to insure complete mixing and uniform exposure to the irradiation from the ultraviolet source located in the central jacket or jackets which passes through the axis of cylindrical chamber 11. Directed by the baffles, the stream of water is made to turn a tortuous path reversing its direction of flow at the end of each baffle, thus insuring complete averaging of the passes taken by each particle to obtain uniform exposure, within the turbulator. Obviously, some opaque deposits will form or accumulate on the surface of jacket 17, which must be removed because they reduce the efficiency of and prevent the ultraviolet rays from passing and which diminish the effect of these rays.

Apparatus according to the invention is designed to accomplish this with minimum of manual effort to provide convenient means for automation operation. The cleaning is accomplished by operation of a four-way valve described hereinbelow.

In order to keep the surface of the jacket 17 clean, the turbulator 30 can be moved longitudinally within the container 11 whereby the scrapers 44, 45, 46, 47 and 55, 56, 57 will wipe the jacket 17. The arrangement is designed in such manner that by each stroke the full length of the distance between two adjacent scrapers is wiped so that the entire working surface of the jacket 17 is cleaned with each stroke.

This longitudinal movement of the turbulator is effectuated by the water pressure itself and by means of the four-way valve 65. As is shown in FIG. 1, water pressure had been applied through pipe line 66 and fitting 71 to the upper part of the container 11, thus moving the turbulator 30 downwards, permitting the water underneath the turbulator to escape through fitting 70, pipe 67 and port 69 of the four-way valve into the drain line 72. When the four-way valve is switched, water pressure is applied to the bottom part of the container 11 through port 69, whereas the water above the turbulator escapes through port 68 into drain line 72. Thus, the turbulator moves upwardly and its scrapers again wipe the jacket 17 clean. This operation takes place without interrupting the sterilizing and purifying action within the turbulator. It is obvious that the velocity of the wiping movement can be easily controlled by inserting throttling plates into the fittings 70 and 71. In this manner, the cleaning operation is accomplished with a minimum amount of effort and can be easily made fully automatic.

Thus, in the original position of the turbulator cylinder stated above, the four-way valve 65 was so positioned as to connect the space below the turbulator to the exhaust line and the space above the turbulator to the supply line. In cleaning the tube, the positioning of the valve is reversed, so that the space in chamber 11 below the turbulator is connected to supply pressure and the space above the turbulator to the exhaust. This will apply full supply pressure within the space at an end of the turbulator head, while at the same time relieving the pressure in the space at the other end of the turbulator. This results in an event and powerful force moving the whole inner assembly to the other end of the chamber. The spacing of the baffle is so proportioned that at the end of its travel, each scraper ring will reach the position that one adjacent to it was before at, thus clearing the entire working surface of the tube jacket 17. The speed of the movement is controlled by the size of the passages in the valve plug. The operation of the unit is not interrupted or impaired during the cleaning cycle. At the time when cleaning is required again, the valve handle is repositioned and the cycle is completed.

While the invention has been described and illustrated with respect to a certain particular preferred example which gives satisfactory results, it will be understood by those skilled in the art after understanding the principle of the invention, that various changes and modifications may be made without departing from the spirit and scope of the invention and it is intended therefore in the appended claims to cover all such changes and modifications.

We claim:

1. An apparatus for continuously purifying fluids, comprising in combination a cylindrical container having a bottom and a cover, centrally arranged bores in said bottom and in said cover, a cylindrical jacket made of transparent material extending longitudinally through said container and through the bottom and the cover thereof, sealing means on said bottom and said cover for fluid-tight sealing said jacket in said bottom and in said cover, tubular means for emitting ultraviolet rays inserted in said jacket, a turbulator movably arranged in said container, said turbulator having bottoms, said bottoms having central bores for permitting the passing of said jacket, scraper means fitted in said bores of said bottoms, said scraper means tightly fitting around said jacket, a plurality of baffle plates in spaced relationship to one another inside said turbulator, each one of said baffle plates having a central bore for permitting the passing of said jacket, a scraper ring loosely fitted in each one of said central bores of said plurality of baffle plates, said scraper ring fitted tightly around said jacket, elongated slots in the outer wall of said turbulator near said bottoms thereof for permitting said fluids to flow through said turbulator, piston rings on the outside of said bottoms of said turbulator, said piston rings providing gliding seals between said turbulator and said container, orifices in the wall of said container opposite said elongated slots in said outer wall of said turbulator, said orifices being connected to pipe lines for said fluids, a fitting in both said bottom and said cover of said container for admitting said fluid under pressure to said container, and a four-way valve having pipe line connections to each one of said two fittings, to one of said fluid pipe lines connected to said orifices and to a drain pipe line, for admitting alternately said fluid under pressure to said bottom or to said cover for moving said turbulator longitudinally in reciprocating manner for enabling said jacket to be wiped clean by said scraper means and by said scraper rings in said bottoms and in said baffle plates, respectively, of said turbulator.

2. An apparatus for continuously purifying fluids, according to claim 1, and having removable means in the wall of said container and having a slot in the wall of said turbulator, said slot corresponding to said removable means, for preventing said turbulator from rotating about its own axis.

3. In an apparatus for continuously purifying fluids comprising a cylindrical container having a bottom and a cover, tubular means for emitting ultraviolet high-frequency, short-wave rays extending longitudinally through said cylindrical container in the center thereof, a jacket consisting of a transparent material circumposed said tubular means and sealing means for said jacket in said bottom and in said cover of said container, a turbulator for said fluids arranged in said container, said turbulator having two bottom plates and a plurality of baffles, said jacket extending through said bottoms and through said plurality of baffles, means for admitting said fluids to said turbulator, scraper means in said bottom plates and in said plurality of baffles, said scraper means tightly fitting around said jacket, means for moving reciprocatingly said turbulator in said container for wiping said jacket of said tubular means for emitting said rays by said scrapers, said means for reciprocatingly moving said turbulator comprising fittings in said bottom and in said cover of said container, and a four-way valve and pipelines connecting said fittings and said four-way valve for alternatingly admitting said fluids either to said bottom or to said cover of said container.

4. In an apparatus for continuously purifying fluids, according to claim 3, and having means in said container for preventing said turbulator from rotating about its own axis.

5. In an apparatus for continuously purifying fluids according to claim 3, said scraper means consisting of Teflon.

6. In an apparatus for continuously purifying fluids comprising a closed cylindrical container, tubular means within said container for emitting ultraviolet rays, said tubular means extending longitudinally through said container in the center thereof, a transparent jacket circumposing said tubular means, a turbulator for said fluids arranged in said container, said turbulator having end closures and a plurality of baffles therebetween, said jacket extending through said end closures and through said baffles, means for admitting said fluids to said turbulator, scraper means in said end closures and said bottom, means for moving reciprocatingly said turbulator in said container for wiping said jacket, said means for reciprocatingly moving said turbulator comprising valve means and means connecting said valve means with said container, said valve means being adapted for alternatingly admitting said fluids to either end of said container selectively.

References Cited in the file of this patent
UNITED STATES PATENTS

| | | |
|---|---|---|
| 1,998,076 | Creighton et al. | Apr. 16, 1935 |
| 2,000,377 | Creighton | May 7, 1935 |
| 2,072,417 | Berndt et al. | Mar. 2, 1937 |